(12) United States Patent
Gong

(10) Patent No.: US 8,320,666 B2
(45) Date of Patent: Nov. 27, 2012

(54) REAL-TIME IMAGE AND VIDEO MATTING

(75) Inventor: Minglun Gong, St. John's (CA)

(73) Assignee: Genesis Group Inc., St. John's (NL)

( * ) Notice: Subject to any disclaimer, the term of this patent is extended or adjusted under 35 U.S.C. 154(b) by 270 days.

(21) Appl. No.: 12/856,316

(22) Filed: Aug. 13, 2010

(65) Prior Publication Data

US 2011/0038536 A1  Feb. 17, 2011

Related U.S. Application Data

(60) Provisional application No. 61/234,131, filed on Aug. 14, 2009.

(51) Int. Cl.
*G06K 9/00* (2006.01)

(52) U.S. Cl. ..................... 382/164

(58) Field of Classification Search ........... 382/173, 382/224, 190, 282–284, 130, 199; 345/589–604, 345/629–630, 640, 621, 619; 348/584, 586, 348/590, 597, 598
See application file for complete search history.

(56) References Cited

U.S. PATENT DOCUMENTS

| | | | | |
|---|---|---|---|---|
| 6,445,816 B1 * | 9/2002 | Pettigrew | ...... | 382/162 |
| 7,599,555 B2 * | 10/2009 | McGuire et al. | ...... | 382/173 |
| 7,636,128 B2 * | 12/2009 | Sun et al. | ...... | 348/586 |
| 7,692,664 B2 * | 4/2010 | Weiss et al. | ...... | 345/592 |
| 8,175,384 B1 * | 5/2012 | Wang | ...... | 382/173 |
| 2007/0013813 A1 | 1/2007 | Sun et al. | | |
| 2008/0198175 A1 * | 8/2008 | Sun et al. | ...... | 345/629 |
| 2009/0278859 A1 * | 11/2009 | Weiss et al. | ...... | 345/629 |

OTHER PUBLICATIONS

X. Bai and G. Sapiro, "A Geodesic Framework for Fast Interactive Image and Video Segmentation and Matting," Proc. ICCV, 2007.
Y. Boykov, O. Veksler, and R. Zabih, "Fast approximate energy minimization via graph cuts," IEEE TPAMI, vol. 23, No. 11, pp. 1222-1239, 2001.
Y.-Y. Chuang, A. Agarwala, B. Curless, D. H. Salesin, and R. Szeliski, "Video Matting of Complex Scenes," Proc. Siggraph, pp. 243-248, 2002.

(Continued)

*Primary Examiner* — Ishrat I Sherali
(74) *Attorney, Agent, or Firm* — Bereskin & Parr LLP/S.E.N.C.R.L., s.r.l.

(57) ABSTRACT

A system and method implemented as a software tool for generating alpha matte sequences in real-time for the purposes of background or foreground substitution in digital images and video. The system and method is based on a set of modified Poisson equations that are derived for handling multichannel color vectors. Greater robustness is achieved by computing an initial alpha matte in color space. Real-time processing speed is achieved through optimizing the algorithm for parallel processing on the GPUs. For online video matting, a modified background cut algorithm is implemented to separate foreground and background, which guides the automatic trimap generation. Quantitative evaluation on still images shows that the alpha mattes extracted using the present invention has improved accuracy over existing state-of-the-art offline image matting techniques.

18 Claims, 5 Drawing Sheets

(a)　　　(b)　　　(c)　　　(d)

OTHER PUBLICATIONS

Y.-Y. Chuang, B. Curless, D. Salesin, and R. Szeliski, "A Bayesian Approach to Digital Matting," Proc. CVPR, pp. 264-271, 2001.

A. Criminisi, G. Cross, A. Blake, and V. Kolmogorov, "Bilayer Segmentation of Live Video," Proc. CVPR, 2006.

M. Gong and Y.-H. Yang, "Near-real-time image matting with known background," in CRV. Kelowna, BC, Canada, 2009.

L. Grady, T. Schiwietz, S. Aharon, and R. Westermann, "Random Walks for Interactive Alpha-Matting," Proc. VIIP, pp. 423-429, 2005.

N. Joshi, W. Matusik, and S. Avidan, "Natural Video Matting using Camera Arrays," Proc. Siggraph, 2006.

A. Levin, D. Lischinski, and Y. Weiss, "A Closed Form Solution to Natural Image Matting," IEEE TPAMI, vol. 30, No. 2, pp. 228-242, 2008.

Y. Li, J. Sun, and H.-Y. Shum, "Video Object Cut and Paste," Proc. Siggraph, pp. 595-600, 2005.

M. McGuire, W. Matusik, H. Pfister, J. F. Hughes, and F. Durand, "Defocus Video Matting," Proc. Siggraph, 2005.

M. McGuire, W. Matusik, and W. Yerazunis, "Practical, Real-time Studio Matting using Dual Imagers," Proc. Eurographics Symposium on Rendering, 2006.

C. Rother, V. Kolmogorov, and A. Blake, ""GrabCut": interactive foreground extraction using iterated graph cuts," Proc. Siggraph, pp. 309-314, 2004.

J. Sun, J. Jia, C.-K. Tang, and H.-Y. Shum, "Poisson matting," Proc. Siggraph, pp. 315-321, 2004.

J. Sun, W. Zhang, X. Tang, and H.-Y. Shum, "Background Cut," Proc. ECCV, pp. 628-641, 2006.

J. Wang, P. Bhat, R. A. Colburn, M. Agrawala, and M. F. Cohen, "Interactive video cutout," Proc. Siggraph, pp. 585-594, 2005.

J. Wang and M. Cohen, "Image and Video Matting: A Survey," FTCGV, vol. 3, No. 2, 2007.

J. Wang and M. Cohen, "An iterative optimization approach for unified image segmentation and matting," Proc. ICCV, pp. 936-943, 2005.

J. Wang and M. Cohen, "Optimized Color Sampling for Robust Matting," Proc. CVPR, 2007.

Wang, J. Finger, Q. Yang, J. Davis, and R. Yang, "Automatic Natural Video Matting with Depth," Proc. PG, 2007.

Jia et al. (Jul. 2006), "Drag-and-Drop Pasting", Proceedings of ACM SIGGRAPH 2006, vol. 25, Issue 3 (available at http://portal.acm.org/), pp. 632-633, section 3.1-3.2.

Gong et al. (May 2010), "Real-Time Video Matting using Multichannel Poisson Equations", Proceeding of Graphics Interface 2010 (available at http://portal.acm.org).

* cited by examiner (a)  (b)  (c)

(a)  (b)  (c)  (d)

(e)  (f)  (g)  (h)

REAL-TIME IMAGE AND VIDEO MATTING

FIELD OF THE INVENTION

The invention relates to methods and systems for image and video processing, and in particular, methods and systems for extracting foreground objects from still images or video sequences where the boundaries between the foreground objects and the background regions are complicated by multiple closed regions, partially covered pixels, similar background color, similar background textures, etc. (i.e. the boundaries are "fuzzy boundaries").

BACKGROUND OF THE INVENTION

Matting studies how to extract foreground objects with per-pixel transparency information from still images or video sequences. Generally speaking, it tries to solve the following ill-posed problem. Given a color image I, which contains both foreground and background objects, calculate the matte $\alpha$, foreground color F, and background color B, so that the following alpha compositing equation is satisfied:

$$I-B=\alpha(F-B) \quad (1)$$

A variety of existing techniques have been developed for still image matting and several algorithms are also proposed for handling video sequences. However, due to the high computational cost involved these methods are not practical for real-time applications, and to date, high quality real-time video matting for dynamic scenes can only be achieved under studio settings using specially designed optical devices and polarized lighting conditions, as is shown in M. McGuire, W. Matusik, and W. Yerazunis, "Practical, Real-time Studio Matting using Dual Imagers," Proc. Eurographics Symposium on Rendering, 2006 (McGuire et al.). There remains a need for a real-time video matting system and method based on color information only for high quality video composition.

Other existing techniques for separating foreground objects from live videos use bilayer segmentation, as shown in A. Criminisi, G. Cross, A. Blake, and V. Kolmogorov, "Bilayer Segmentation of Live Video," Proc. CVPR, 2007 (Criminisi et al.) and J. Sun, W. Zhang, X. Tang, and H.-Y. Shum, "Background Cut," Proc. ECCV, pp. 628-641, 2006 (Sun et al. 2006). Using just color information, their algorithm can extract the moving foreground object in real-time, making it a powerful technique for video conferencing and live broadcasting. However, bilayer segmentation cannot capture the fuzzy boundaries surrounding the foreground object caused by hair, fur, or even motion blur. Although the border matting technique, as described in C. Rother, V. Kolmogorov, and A. Blake, ""GrabCut": interactive foreground extraction using iterated graph cuts," Proc. Siggraph, pp. 309-314, 2004 (Rother et al.) is applied to alleviate the aliasing problem along object boundaries, the strong constraint used in border matting limits its capability of handing objects with complex alpha matte, such as the one shown in FIG. 1. As such, there remains a need for a system and method capable of real-time video matting to extract alpha matte in so called "fuzzy" areas within the video image.

The prior art for image matting techniques (as opposed to video matting techniques) was well summarized in J. Wang and M. Cohen, "Image and Video Matting: A Survey," FTCGV, vol. 3, no. 2, 2007.

There are a number of non-real time, offline techniques which require a posteriori knowledge, or future frames, to obtain an accurate trimap estimation of the foreground image, background image and boundary. In their Bayesian video matting approach, Y.-Y. Chuang, A. Agarwala, B. Curless, D. H. Salesin, and R. Szeliski, "Video Matting of Complex Scenes," Proc. Siggraph, pp. 243-248, 2002, (Chuang et al. 2002) require users to manually specify trimaps for some key frames. These trimaps are then propagated to all frames using the estimated bidirectional optical flows. Finally the alpha matte for each frame is calculated independently using Bayesian matting, also shown in Y.-Y. Chuang, B. Curless, D. Salesin, and R. Szeliski, "A Bayesian Approach to Digital Matting," Proc. CVPR, pp. 264-271, 2001 (Chuang et al. 2001). Trimaps may also be generated from binary segmentations in two know video object cutout approaches (Y. Li, J. Sun, and H.-Y. Shum, "Video Object Cut and Paste," Proc. Siggraph, pp. 595-600, 2005 and J. Wang, P. Bhat, R. A. Colburn, M. Agrawala, and M. F. Cohen, "Interactive video cutout," Proc. Siggraph, pp. 585-594, 2005). Individual frames are over-segmented into homogenous regions, based on which a 3D graph is constructed. The optimal cut that separates foreground and background regions are found using 3D graph cuts. Pixels within a narrow band of the optimal cut are labelled as unknown regions, with their alpha values estimated using image matting techniques. In the geodesic matting algorithm described in X. Bai and G. Sapiro, "A Geodesic Framework for Fast Interactive Image and Video Segmentation and Matting," Proc. ICCV, 2007 (Bai & Sapiro), no over-segmentation is required as the algorithm treats the video sequence as a 3D pixel volume. Each pixel is classified into foreground or background based on its weighted geodesic distances to the foreground and background scribbles that users specified for a few key frames. The alpha values for pixels within a narrow band along the foreground/background boundaries are explicitly computed using geodesic distances. The above approaches are all designed to handle pre-captured video sequences offline, both of which utilize the temporal coherence (i.e. future information) for more accurate results.

Existing "online"/"real time" video matting techniques available suffer from undesirable computational delay or the requirement for multiple cameras. For example in the defocus matting technique of M. McGuire, W. Matusik, H. Pfister, J. F. Hughes, and F. Durand, "Defocus Video Matting," Proc. Siggraph, 2005, the scene is captured using multiple optically aligned cameras with different focus/aperture settings and the trimap is automatically generated based on the focus regions of captured images. However, the alpha matte is then calculated by solving an error minimization problem, a computation which takes several minutes per frame.

Automatic video matting can also be done using a camera array, as shown in N. Joshi, W. Matusik, and S. Avidan, "Natural Video Matting using Camera Arrays," Proc. Siggraph, 2006. The images captured are aligned so that the variance of pixels reprojected from the foreground is minimized whereas the one of pixels reprojected from the background is maximized. The alpha values are calculated using a variance-based matting equation. The computational cost is linear with respect to the number of cameras and near-real-time processing speed is achieved. In M. McGuire, W. Matusik, and W. Yerazunis, "Practical, Real-time Studio Matting using Dual Imagers," Proc. Eurographics Symposium on Rendering, 2006 (McGuire et al.), the background screen is illuminated with polarized light and the scene is captured by two cameras each with a different polarizing filter. Since the background has different colors in the two captured images, the simple blue screen matting can be applied to extract the alpha matte in real-time, but only in this controlled setting. These "online" matting approaches require images captured from multiple cameras and utilize additional information, such as focus, polarization settings or viewpoint changes. There is a need for an "online" (i.e. using only current and past frames) and real-time video matting system and method which may be implemented using one camera (i.e. one input video stream) and which can generate accurate alpha matte data in real-time using color information only.

An existing method with a useful approach to the problem in image matting is the Poisson matting algorithm from J. Sun, J. Jia, C.-K. Tang, and H.-Y. Shum, "Poisson matting," Proc. Siggraph, pp. 315-321, 2004 (Sun et al. 2004). However, in Sun et al. 2004, matting is performed on a single color channel k.

Poisson matting is computationally efficient and easy to implement. However, it tends to yield large errors when the trimap is imprecise and/or the background is not smooth. Sun et al suggest that manual editing using local Poisson equations can be applied to correct the errors, but this approach is impractical when handling video sequences.

In O. Wang, J. Finger, Q. Yang, J. Davis, and R. Yang, "Automatic Natural Video Matting with Depth," Proc. PG, 2007, it was shown that additional depth information captured using a depth sensor helps to improve matting qualities. However, for Poisson matting, the depth information had only previously been used for validation, since prior Poisson based methods only used a single color channel.

There is a need for an improved system and method for video matting which does not require future video sequence information to perform matting on the current frame, and which is capable of robust boundary analysis. There is also a need for a video matting system which is able to operate in real time (i.e. during the inter-image capture period of the film process), using only color vector information, and, if available, depth information, to generate a commercially reliable foreground and background extraction. Real-time can be understood as a process which meets either of these criteria.

SUMMARY OF THE INVENTION

The present invention is an image and video matting system and method which applies a Poisson matting approach to the 3 color vector space of the video input sequence. Quantitative evaluations show that the approach of the present invention reduces the matting error by 65-90% on the five datasets tested over existing Poisson matting techniques.

Several important and new improvements over the original Poisson matting techniques are disclosed. First, a novel set of Poisson equations are derived, which compute the gradient of the alpha using all color channels simultaneously, instead of a selected color channel. This not only avoids any complex channel selection process, but also improves the matting accuracy.

Second, a new way of generating the initial alpha matte solution in the RGB color space is optionally used in the color-space matte initialization step, where it both helps to accelerate the convergence of the steps to create the alpha matte, but also improves the robustness of the Poisson matting technique against imprecise trimap specification.

It is an object of the present invention to create a matting system and method (for use with either still images or video) capable of high quality matte extraction with a high degree of accuracy in a wide variety of image boundary conditions, in real-time. The system and method presented is able to perform matting using only observed color information at real-time speed and to produce alpha mattes with qualities comparable to existing offline image matting approaches. When additional information, such as background color and/or scene depth, is available, this additional information can be incorporated into the system and method to further improve the matting accuracy.

In the present context, real-time is defined in two respects: 1. processing given frames based only on the previous frames are available to the system; and 2. computational efficiency to process all frames within the average inter-frame period.

The method of the present invention, when optimized for parallel implementation on current graphics processing units (each a GPU) of programmable graphics cards is capable of processing speeds of 40 fps for video of 640×480 resolution. As computer hardware technology advances, additional processing power may be used to process images of high resolution in real time, using the modified Poisson equations of the present invention. As used herein, graphics processing unit or GPU refers to any computer system comprising a dedicated video or graphics processor capable of being instructed by the computer system to perform the operations of the present invention.

The method is based on a general multichannel Poisson equation for matting based on more than one variable of color information. Two variants of the equation are selectively employed for handling cases where either the background or the depth of the scene can be captured or recovered. The method also applies a novel multichannel equation for alpha matte initialization on the video sequence, to further improve performance.

The method also permits active substitution of the boundary region by using a semi-transparent alpha matte, in which pixels which remain in the boundary regions following a sufficient number of iterations of the multichannel Poisson equation are assigned a value to represent the proportion by which the method determines the pixel lies partially in the foreground or background.

Color distribution information is carried forward from past frames of a video sequence to the current frame being processed to improve the foreground estimation.

When available, depth information is incorporated directly into the multichannel Poisson equation as an additional channel to improve foreground estimation. In this context, channel is used to signify dimension or variable: i.e. for a tri-color input frame, the depth channel would represent a fourth dimension in the multivariable space for which the Poisson equations are designed.

Equation for General Color Image Matting in 3-Color Vector Space

Unlike the previous approaches, the multichannel Poisson equations used in the present invention are derived using all color channels. This is done by first rearranging Equation (1) into:

$$I - B = \alpha(F - B) \quad (2)$$

Taking the gradient on both sides and applying the Leibnitz's law yields:

$$\nabla \otimes (I-B) = \nabla \alpha \otimes (F-B) + \alpha \nabla \otimes (F-B) \quad (3)$$

where $\nabla \otimes I$ represents the tensor product between the gradient operator and color image I. That is $$\nabla \otimes I = \begin{bmatrix} \frac{\partial I_r}{\partial x} & \frac{\partial I_g}{\partial x} & \frac{\partial I_b}{\partial x} \\ \frac{\partial I_r}{\partial y} & \frac{\partial I_g}{\partial y} & \frac{\partial I_b}{\partial y} \end{bmatrix} \quad (4)$$

Instead of relying on the smoothness assumption to omit the unknown α term, multiply column vector (F−B) on both sides of Equation (5) to obtain:

$$\nabla \otimes (I-B)(F-B) = \nabla \alpha \otimes (F-B)(F-B) + \alpha \nabla \otimes (F-B)(F-B) \quad (5)$$

Now, the unknown a can be removed by substituting Equation (2) into Equation (5), which yields:

$$\nabla \otimes (I-B)(F-B) = \nabla \alpha [(F-B) \cdot (F-B)] + \nabla \otimes (F-B)(I-B) \quad (6)$$

Therefore, the gradient of alpha can be calculated using:

$$\nabla \alpha = \frac{\nabla \otimes (I-B)(F-B) - \nabla \otimes (F-B)(I-B)}{(F-B) \cdot (F-B)} \quad (7)$$

$$= \frac{\nabla \otimes I(F-B) - \nabla \otimes F(I-B) - \nabla \otimes B(F-I)}{(F-B) \cdot (F-B)}$$

It is noteworthy, that the above equation is derived without any approximation. Therefore, if both foreground and background colors are known, and different (the Smith-Blinn assumption), the gradient of alpha can be precisely calculated. When they are both unknown, however, the method of the present invention assumes they are smooth and omits their gradients. This gives the following multichannel Poisson equation:

$$\nabla \otimes F \approx 0, \nabla \otimes B \approx 0 \quad (8)$$

$$\Rightarrow \Delta \alpha \approx div(G) = div\left(\frac{\nabla \otimes I(F-B)}{(F-B)\cdot(F-B)}\right)$$

where G is the approximate gradient of matte.

Improved Matting by Incorporation of Known Background

As shown in Chuang et al. 2002, given that the background information estimated from input video sequence can help to improve matting quality, the multichannel Poisson matting derivation of the present invention can be improved by incorporating any known background information. In such cases, instead of selectively omitting both foreground and background gradients, the method may selectively omit only the gradient of unknown foreground. Hence, the following Poisson equation can be derived from Equation (6):

$$\nabla \otimes F \approx 0 \Rightarrow \Delta \alpha \approx div(G_B) = div\left(\frac{\nabla \otimes I(F-B) - \nabla \otimes B(F-I)}{(F-B)\cdot(F-B)}\right) \quad (9)$$

where $G_B$ is the approximate gradient of matte under known background, which is a more accurate approximation than G.

Improved Matting by Incorporation of Known Depth

Using the vector based approach of the current method, the depth information can be integrated naturally into the matting equation as an additional dimension to the vector space. The method assumes that depth readings in fuzzy areas follow the same alpha compositing rule as color, does. Whether or not this assumption holds depends on the mechanism used for capturing depth, but the method of the present invention this assumption which can be tested empirically. The assumption results in the following relationships:

$$\begin{cases} I - B = \alpha(F-B) \\ \lambda(I_d - B_d) = \alpha\lambda(F_d - B_d) \end{cases} \quad (10)$$

where $F_d$, $B_d$, & $I_d$ are the foreground, background, and observed depths, respectively. Parameter λ controls the contribution of the depth information.

Following the same derivation from Equations (3-8) gives the following Poisson equation:

$$\Delta \alpha \approx div(G_D) = div\left(\frac{\nabla \otimes I(F-B) + \lambda^2 \nabla I_d (F_d - B_d)}{(F-B)\cdot(F-B) + \lambda^2(F_d - B_d)(F_d - B_d)}\right) \quad (11)$$

where $G_D$ is the approximate gradient of alpha with known depth.

Alpha Matte Initialization

Once the Poisson equation is established, a unique solution can be computed, which minimizes the following variational problem:

$$\alpha^* = \underset{\alpha}{\operatorname{argmin}} \int \int_{p \in \Omega} \|\nabla \alpha(p) - G(p)\|^2 dp \quad (12)$$

where Ω is the unknown region in the trimap.

Since the gradient of alpha obtained using estimated foreground and background may be inaccurate, the solution found by solving the Poisson equation may not be optimal. FIG. 2 illustrates this problem using a 1D example.

The present invention solves the above problem by computing an initial alpha matte in the color space, before solving the matte in the gradient space. In practice, when solving the Poisson equation numerically under limited precision, e.g., the alpha values may be represented using integers within [0, 255] on the GPU, the final solution may not converge to the global optimum. As a result, when a good initial alpha matte is provided, the solution found can actually be better than the one that minimizes Equation 12. To generate a good initial solution, here we compute the initial alpha matte directly in the color space, before using the Poisson equation to solve the matte in the gradient space. This way, the ambiguities associated with inferring colors from inaccurate gradients can be resolved using the initial solution obtained from the color space.

The equation for alpha initialization is derived by taking the dot product of (I−B) on both sides of Equation (2):

$$(I-B)\cdot(I-B) = \alpha(F-B)\cdot(I-B) \Rightarrow \alpha = \frac{(I-B)\cdot(I-B)}{(F-B)\cdot(I-B)} \quad (13)$$

where F and B are estimated foreground and background colors in the unknown region, respectively.

Similar equations can be derived by computing dot-products with other color difference vectors, such as (F−B) or (F−I). However, in practice a system of the present invention would preferably use (I−B), since I is known and B, if unknown, can be more accurately estimated than F can be.

Testing of the above alpha matte initialization approach confirms that not only does the Poisson equation computation process converge faster, but the process also yields a more accurate alpha matte, especially when the trimap contains large unknown regions.

The present invention achieves real-time alpha matte extraction from an image or video sequence by an appropriate selection of initialization alpha matte directly in the color space using the known and easily estimated color components of a frame. As the background estimation improves based on previous (and possibly the current) frames, the method and system of the present invention is able to incorporate this knowledge directly into the Poisson equations. If additional depth sensor information is included with the image or video capture device, this depth information may also be incorporated directly into the same computation process as an additional dimension within the vector space.

The final alpha matte generated provides an alpha value for each pixel in the input frame—for instance, the foreground pixels have alpha value of "1", background pixels have value "0", and pixels in boundary regions have values between "0" and "1". As a skilled practitioner would be aware, the assignment of either 0 or 1 to foreground is arbitrary and it is not a departure from the present invention to use the reverse values or unnecessarily complicated values for the trimap, all of which would be considered within the scope of the present invention. The foreground colors for all pixels in the boundary regions are then calculated based on Equation (1) using the estimated alpha matte, estimated background colors and/or estimated foreground colors and the actual image values. Both alpha matte and foreground colors are then used for generating high quality image and video composite with new background images or videos.

In general, the method of the present invention can be considered both as a method for extraction of a foreground object from a background region within a color input frame using a computer system having a graphics processing unit, and a method for performing the same extraction on a video sequence in real time. In each case, the following steps are performed:
  a. inputting the input frame as a set of frame pixels in a multivariable color space digital format to the computer system;
  b. applying computer implemented instructions for bilayer segmentation to create an initial trimap for the input frame which partitions the frame pixels into initial estimates for the background region, the foreground object and a boundary set;
  c. the computer system selecting a selected multichannel Poisson equation from a predetermined set of multichannel Poisson equations based on the color input frame and whether there is related depth information or background color information;
  d. the computer system iteratively solving the selected multichannel Poisson equation for the frame pixels within the boundary set, until the earlier of (A) a first decision criteria assigning such frame pixel to either the foreground object or the background region if the first decision criteria is met or (B) a second decision criteria to proceed notwithstanding that the first decision criteria has not been met; where the selected multichannel Poisson equations treat each of a plurality of the dimensions within the multivariable color space as a channel;
  e. the computer system generating an output trimap for the input frame in which the frame pixels assigned to the background region set in steps (b) and (d) are assigned a background number, the image pixels assigned to the foreground object in steps (b) and (d) are assigned a foreground number, and the image pixels not so assigned are each assigned a boundary value representing the percentage by which such frame pixel may be in the foreground or the background; and
  f. possibly performing the prior steps in (d) and (e) over successive iterations using the output trimap in place of the initial trimap within the selected Poisson equation.

A system of the present invention is a software implementation of the present invention operating on a computer system having a graphics processing unit. The graphics processing unit has a so called Z-kill feature which is employed once a pixel is assigned to the foreground or background to ensure that such pixel will not be unnecessarily processed again.

DETAILED DESCRIPTION OF THE INVENTION

Certain implementations of the present invention will now be described in greater detail with reference to the accompanying drawings.

Figure 3:
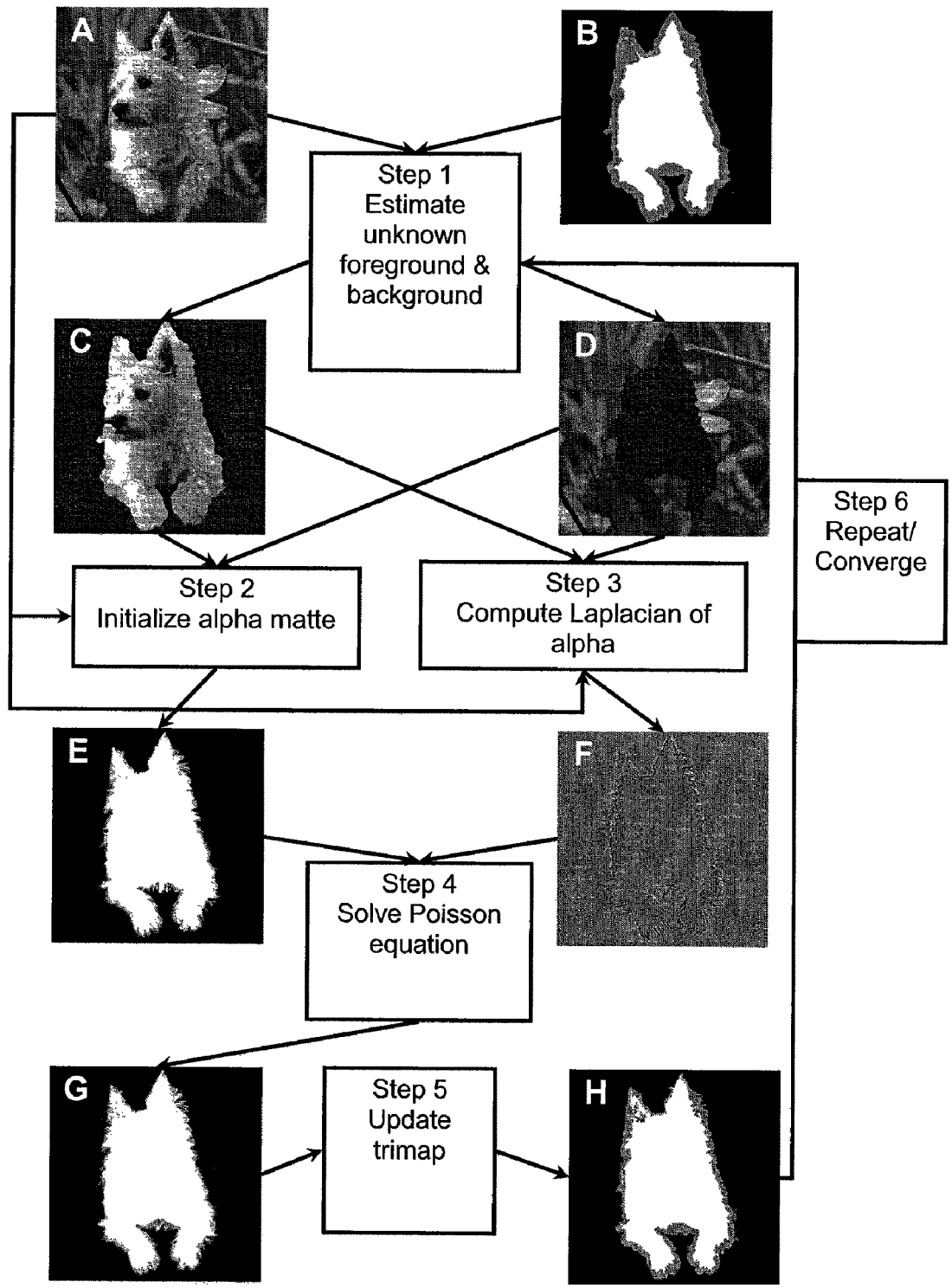
FIG. 3 is a flowchart of the method of the present invention showing, at each of the steps, intermediate results obtained for the "dog" dataset from J. Wang and M. Cohen, "Optimized Color Sampling for Robust Matting," Proc. CVPR, 2007 (Wang & Cohen 2007), using the fifth trimap.

FIG. 3 is a flowchart showing the steps involved in the method of the present invention for extracting alpha matte based on a given trimap for a still image.

For real time performance, all these procedures are optimized for parallel execution on GPUs. In addition, the early Z-kill feature is utilized to limit the computations to the unknown region of the trimap only. This is done by initializing the depth buffer in which known foreground and background pixels are assigned with zero depth values. Therefore, these pixels will not be processed when rendering image-sized quad positioned further away. Our tests show that enabling early Z-kill greatly improves the processing speed. FIG. 3 shows: input/source image (A); input trimap (B); estimated foreground (C); estimated background (D); initial alpha matte (E); approximate Laplacian of matte (F); estimated alpha matte (G); updated trimap (H); Step 1, estimate unknown foreground & background; Step 2, initialize alpha matte; Step 3, compute the Laplacian of alpha; Step 4, solve the Poisson equations; Step 5, update trimap; and Step 6, repeat until convergence.

Using the source image (A) and a given trimap (B) as inputs, the first step (Step 1) estimates the colors of both foreground and background in the unknown region. Based on the smoothness assumption, an unknown pixel's foreground/background color can be approximated using the color of the nearest pixel in the known foreground/background region. As such, an image morphology based procedure is used. The procedure fills an unknown foreground (background) pixel with the average color of its neighbours if and only if at least one of its four neighbors has known foreground (background) color. Once a pixel is filled, the depth buffer used for early Z-kill is updated accordingly so that the pixel will not be processed again.

The estimated foreground colors (C) and background colors (D), as well as the source image (A), are then used as inputs to Step 2 for initializing the alpha matte (E) based on Equation (13). The initial solution obtained by the method, as shown in image (E) for the "dog" test image, is quite accurate even when both foreground and background contain detailed textures. However close inspection shows that, due to imprecise foreground/background color estimation, artifacts do exist in areas such as the one highlighted with the grey rectangle.

The same inputs are also used for calculating the approximate Laplacian of alpha (F) as Step 3. Depending on whether and what additional information is available, one of the Equations (8), (9), or (11) is selected. In the test case shown, Equation (8) has been used since no additional depth or background color information was available. The Laplacian of alpha (F) provides details on how the alpha matte changes locally, which helps to correct errors in the initial solution.

With the initial alpha matte (E) and the Laplacian of alpha (F) computed, these are inputs to establish the Poisson equation for Step 4, which can be solved to create estimated alpha matte (G). To facilitate parallel implementation on a system comprising GPUs, in one implementation of the method of the present invention the Jacobi method is used to solve the Poisson equation. Although the Jacobi method has the reputation of slow convergence, using the method of the present invention it takes about 50 iterations based on testing, the faster convergence credited to the accurate initial solution obtained. To provide a robust solution within the real-time constraints desired for the system, the number of iterations for Step 4 is therefore fixed at 64, but could in practise be fixed to a different limit depending on a user's requirements or other design considerations without departing from the present invention.

At each iteration within Step 4 of FIG. 3, the estimated alpha matte (G) permits the generation of a more accurate trimap, which helps to obtain better foreground/background estimations and in turn better alpha matte. A new trimap (H) is obtained through applying multilevel thresholding on the estimated alpha matte (G) at Step 5. That is, a pixel is labelled as foreground if the estimated alpha value is higher than $T_{high}$ and as background if the alpha value is lower than $T_{low}$. In a preferred implementation of the invention, and for the purposes of FIG. 3, the two thresholds within Step 5 are fixed at 0.95 and 0.05, respectively, but may be fixed at different values without departing from the present invention, provided that the converge criteria and processor speed permit real time application of the method.

The updated trimap (H) of FIG. 3 is used to repeat the matte extraction process as Step 6. Ideally the process should repeat until it converges, i.e., the updated trimap is the same as the previous version. However, to ensure constant processing speed, a user-specified (fixed) number of iterations, N, are used. Testing has revealed that just two iterations of Step 6 are sufficient in most cases, and as such, N=2 is the value used for the images in all of the Figures.

In order to process video sequences online, a bilayer segmentation procedure is implemented, whose output is used to generate trimaps automatically for each frame. The bilayer segmentation procedure attempts to find a binary labelling that minimizes an energy function of the form:

$$L^* = \underset{L}{\operatorname{argmin}} \sum_{p \in I} D(L(p)) + \mu \sum_{(p,q) \in \Gamma} C(L(p), L(q)) \quad (14)$$

where $D(L(p))$ is the data term that measures how well the labelling agrees with the measurements, $(L(p), L(q))$ is the contrast term that encourages neighboring pixels to have the same label if they have similar colors (and depths), $\mu$ is a constant for balancing the two terms, and $\Gamma$ denotes the set of all 4- or 8-connected neighboring pixel pairs.

A widely adopted contrast term is used here, which is defined as:

$$C(L(p), L(q)) = |L(p) - L(q)| \cdot e^{\frac{-\|I_p - I_q\|^2}{\gamma}} \quad (15)$$

where $\|I_p - I_q\|$ is the L2 norm of the color difference between pixels p and q. $\gamma$ is set to $2 \langle \|I_p - I_q\|^2 \rangle$, where $\langle . \rangle$ indicates expectation over all connected pixel pairs in an image.

When handling videos sequences without additional depth information, the present invention proposes that a variant of the background cut of Sun et al. 2006 be applied. Similar to Sun et al. 2006, the data term can be calculated using the log of the color likelihood or other known methods such as Gaussian Mixture Models and learning the foreground and background mixtures via Expectation Maximization (EM) in the multivariable color space (e.g. RGB, YUV, YIQ, HSV etc). A practitioner should be aware that this methodology assumes that the camera is mostly stationary and the background is not cluttered. As such, a simplification is made that the background likelihood model does not change over time. Alternatively, for the foreground color model, instead of modeling the color likelihood using Gaussian Mixture Models and learning the foreground mixtures via Expectation Maximization (EM), another embodiment of the invention models the foreground color likelihood non-parametrically using histogram in the RGB space. This simplification greatly reduces the computational costs and negates the need for EM initialization. The foreground color likelihood model can then be learned over successive frames at low computational cost. Preferably, the computer implementation of the present invention updates the color histogram for foreground pixels dynamically according to the segmented foreground image data from the previous frame. A moderate amount of smoothing can be applied to the 3D color histogram to avoid over-learning.

In addition, when depth is captured using a depth sensor, the data term is computed using both color and depth information. The foreground and background depth likelihoods can be modeled using two Gaussian models learned from the depth values of labelled foreground/background pixels in one or more of the previous frames. This learning process ensures that the most recent depth variations in the scene are captured.

Once the per-pixel labeling costs are calculated using the data term, a preferred implementation of the method of the present invention finds the optimal label assignment that minimizes Equation (14) using the known min-cut algorithm adopted from Y. Boykov, O. Veksler, and R. Zabih, "Fast approximate energy minimization via graph cuts," IEEE TPAMI, vol. 23, no. 11, pp. 1222-1239, 2001 (Boykov et al.). The trimap is then generated from the binary segmentation result by eroding both foreground and background regions and labeling the in-between area as unknown.

A practitioner should also note that depth information is usually more stable than appearance based cues/information in images and video which are challenging to process, such as video and images with scenes that contain dynamic background, sudden illumination change etc. Therefore when scene depth is available the method is no longer bound by the assumption that the background appearance is previously known and/or uncluttered and/or stationary, and the method of the present invention with depth information models both foreground/ and background color likelihoods dynamically with color histograms. By combining color and depth cues/information the binary segmentation process is less sensitive to lighting variation, moving objects and camera shaking, making the system and method of the present invention with depth information more flexible and robust in various scenarios.

Quantitative Evaluation using Still Images

Figure 4:
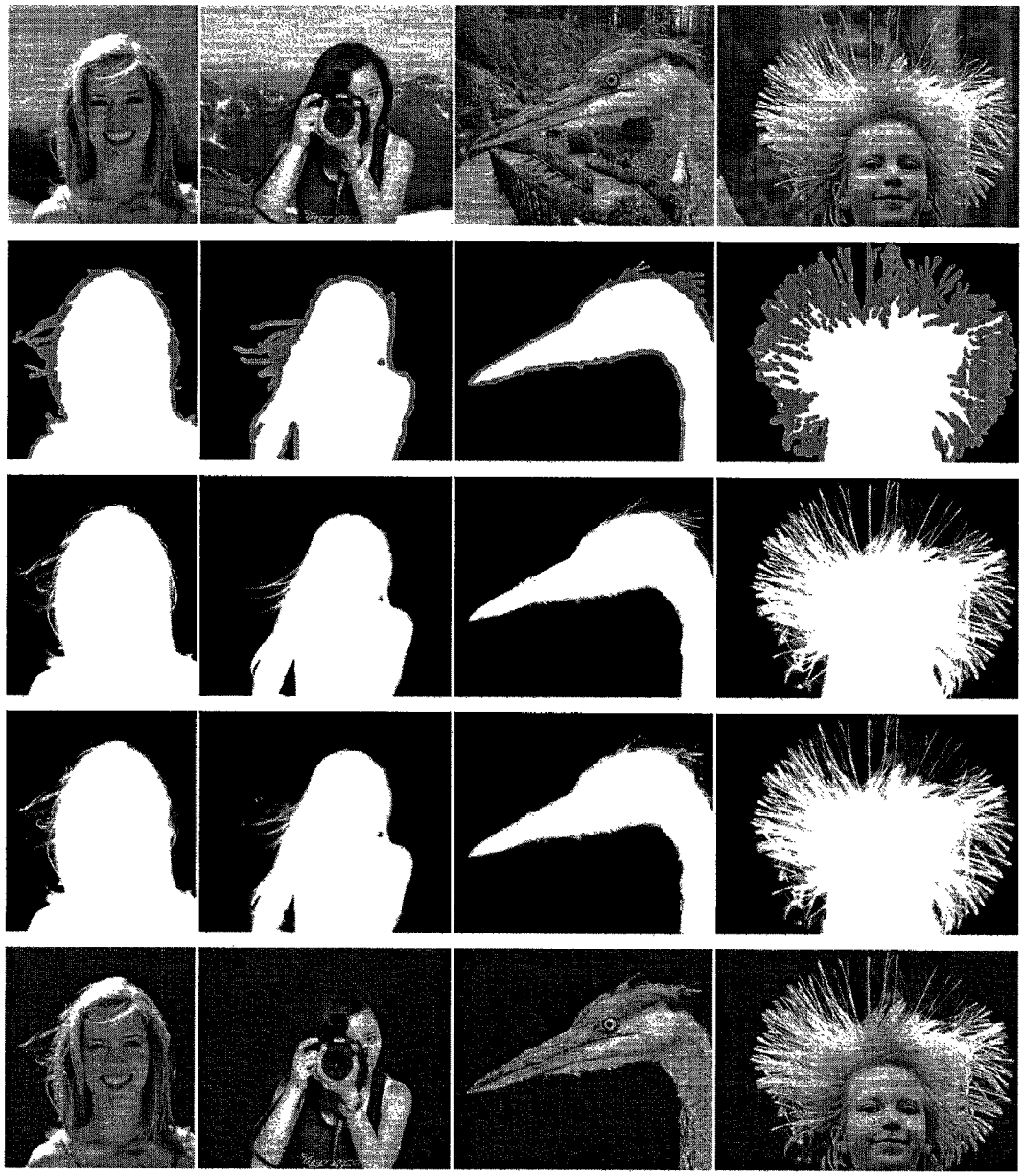
FIG. 4 is a series of trial results for the application of an embodiment of the present invention on the "hair", "camera", "bird", and "child" datasets from Wang & Cohen 2007 (the "datasets"), using the second trimap; showing, from top to bottom: the source images, the input trimaps from the dataset, ground truth alpha mattes from the data set, estimated alpha mattes using the method and the input trimaps, and composite results.

A preferred embodiment of the present invention, using the fixed parameters noted above, is evaluated using datasets with ground truth alpha mattes presented by Wang & Cohen 2007. Each dataset contains ten different trimaps of different levels of accuracy, with T0 being the most accurate and T9 being the lease least accurate. The result for the "dog" dataset shown in FIG. 3 is generated using the fifth trimap. The results for the other four datasets obtained using the second trimap (a non-ideal selection) are shown in FIG. 4. In FIG. 4, the top row represents the input image. The second row represents the input trimap corresponding to the image in the first row, where black represents assumed background, white represents assumed foreground, and grey represents the boundary area which will be refined as either background, foreground or some percentage of background and foreground. The third row represents the ideal or ground truth alpha matte provided in the dataset, and the fourth row represents the results of the test—a real-time, automatically generated alpha matte. The fifth row is the application of the alpha matte to the input image or frame to create a new composition (in this case with an all blue background, but generically, any new background could be used).

These results confirm that the proposed algorithm can produce visually appealing alpha mattes for complex scenes.

For quantitative evaluation of the preferred implementation of the current inventive method, an alpha matte is generated using each of the ten trimaps provided in the dataset and the accuracy of the preferred implementation is evaluated using the mean square error (MSE). The lowest MSE value among the ten results ($E_{min}$) and the difference between the highest and the lowest MSE values ($E_{diff}$) are shown in Table 1. The latter measurement gives a good indication of method robustness.

TABLE 1

Quantitative comparison with existing algorithms

| | Dog | | Hair | | Camera | | Bird | | Child | |
|---|---|---|---|---|---|---|---|---|---|---|
| | $E_{min}$ | $E_{diff}$ | $E_{min}$ | $E_{diff}$ | $E_{min}$ | $E_{diff}$ | $E_{min}$ | $E_{diff}$ | $E_{min}$ | $E_{diff}$ |
| Poisson (Sun et al. 2004) | 340 | 1330 | 359 | 1830 | 451 | 2891 | 879 | 3174 | 832 | 2442 |
| Random walk (Grady et al) | 198 | 307 | 274 | 401 | 151 | 393 | 279 | 638 | 1732 | 1795 |
| Knockout (Boykov et al.) | 154 | 596 | 150 | 516 | 33 | 336 | 338 | 1387 | 435 | 888 |
| Bayesian (Chuang et al.) | 82 | 724 | 69 | 406 | 28 | 687 | 194 | 938 | 120 | 4994 |
| Iterative BP (Wang & Cohen 2005) | 69 | 356 | 78 | 362 | 27 | 227 | 207 | 903 | 214 | 553 |
| Closed-form (Levin et al.) | 59 | 137 | 77 | 143 | 23 | 356 | 157 | 237 | 503 | 582 |
| Robust (Wang & Cohen 2007) | 41 | 95 | 31 | 165 | 10 | 155 | 69 | 381 | 114 | 394 |
| Present Method | 78.1 | 234 | 67.2 | 317 | 48.3 | 292 | 188 | 912 | 287 | 509 |
| (rank) | (4) | (3) | (2) | (3) | (6) | (3) | (3) | (5) | (4) | (2) |

Table 1 shows the quantitative comparison between the present method and existing algorithms, using the measurements for existing approaches reported in Wang & Cohen 2007, where $E_{min}$, is the minimal MSE value obtained using 10 different trimaps; and $E_{diff}$ is the difference between the maximal and the minimal MSE values. The existing methods are either described in the references noted above, or: (A) in the case of the random walk, L. Grady, T. Schiwietz, S. Aharon, and R. Westermann, "Random Walks for Interactive Alpha-Matting," Proc. VIIP, pp. 423-429, 2005 (Grady et al.); (B) in the case of the closed form, in A. Levin, D. Lischinski, and Y. Weiss, "A Closed Form Solution to Natural Image Matting," IEEE TPAMI, vol. 30, no. 2, pp. 228-242, 2008 (Levin et al.); and (C) in the case of Iterative BP, J. Wang and M. Cohen, "An iterative optimization approach for unified image segmentation and matting," Proc. ICCV, pp. 936-943, 2005 (Wang & Cohen 2005).

As shown in Table 1, when compared to the global Poisson matting, the multichannel Poisson matting of the present invention reduces $E_{min}$ value by 65~90% and the $E_{diff}$ value by 70~90%. This suggests that the approach of the present invention is not only more accurate than the original Poisson matting, but also more tolerant to imprecise trimaps, which is an important property for video matting since automatically generated trimaps are generally not as accurate as manually labelled ones. It is also noteworthy that the performance gain is achieved without using any additional information. The results can be further improved if the background or depth information is available, and the corresponding multivariable Poisson equations selected for use.

The comparison also suggests that the approach of the present invention is comparable to other state-of-the-art matting approaches. It ranks on average 3.8 out of 8 on $E_{min}$ measure and 3.2 out of 8 on $E_{diff}$ measure.

Considering that the multichannel Poisson matting method with the fixed parameters noted above is designed for handling video sequences in real-time, whereas the more highly ranked methods all require seconds/minutes on a single image, the relative success of the present invention on still images is clearly demonstrated.

Nevertheless, being a Poisson-matting-based approach, the presented algorithm inherits the assumption that the foreground and the unknown background are smooth. Otherwise, artifacts may occur, as noted below.

The performance gain over the original Poisson matting algorithm can be attributed to both multichannel Poisson equation and color-space matte initialization techniques.

Figure 7:
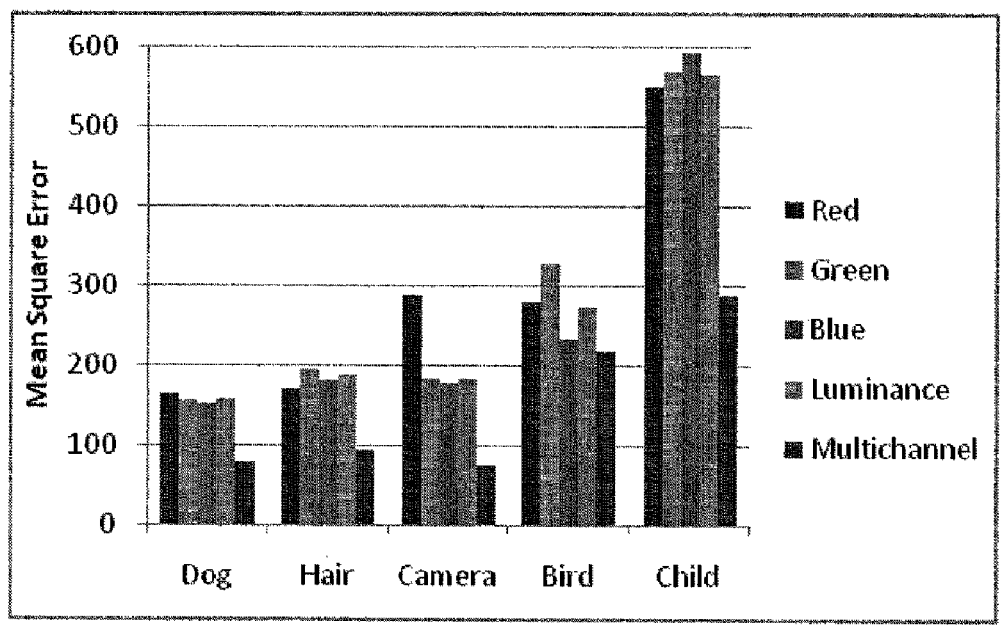
FIG. 7 is a bar graph comparing the alpha matting results obtained using single channel Poisson equations and the multichannel Poisson equations of the present invention using the "hair", "camera", "bird", and "child" datasets from Wang & Cohen 2007, and the second trimap in each case.

The advantage of multichannel Poisson equation over the original single channel Poisson equation is demonstrated in FIG. 7. The comparison is conducted on all five datasets from Wang & Cohen 2007 and the second trimap is used under all cases. The results for single channel Poisson equation are obtained using the RGB channels, and the combined luminance values, respectively.

The results show that, for all five datasets, using the multichannel Poisson equation gives more accurate alpha mattes than applying the single channel equation on any of the four selected channels. On average, the multichannel equation helps to reduce the MSE by about 50%.

Figure 8:
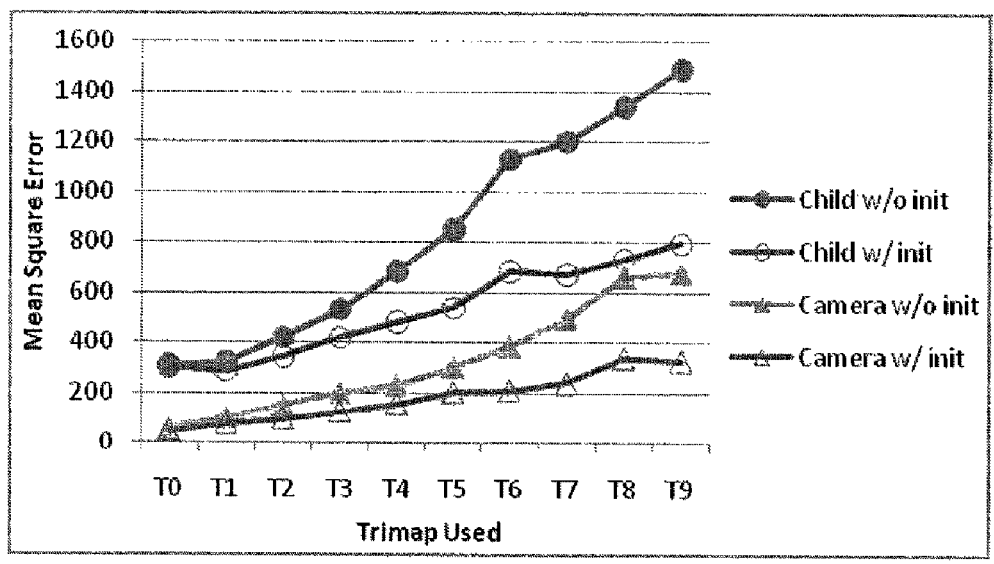
FIG. 8 is a graph comparing the matting results obtained with and without using the color space matte initialization.

FIG. 8 compares the alpha mattes obtained with and without enabling color-space matte initialization. The comparison is performed on the "child" and "camera" datasets under different input trimaps. When the color-space matte initialization is disabled, the initial alpha values for all unknown pixels are set to 0.5.

The results suggest that, the color-space matte initialization step does not offer much improvement over the conventional approach when the most accurate trimap (T0) is used, but becomes very helpful when the input trimap is inaccurate. This is because, when the trimap is precisely defined and the unknown region is small, the gradient of alpha can be more accurately estimated. Hence, which initial values are used has little effect on the numerical solution of the Poisson equation. However, as the unknown region gets larger and the gradient information becomes unreliable, solving the Poisson equation numerically with limited precision becomes ambiguous and better initial values become very important. In practise, therefore, the benefit of color-space matte initialization improves the current method significantly.

Video Matting Results

Figure 1:
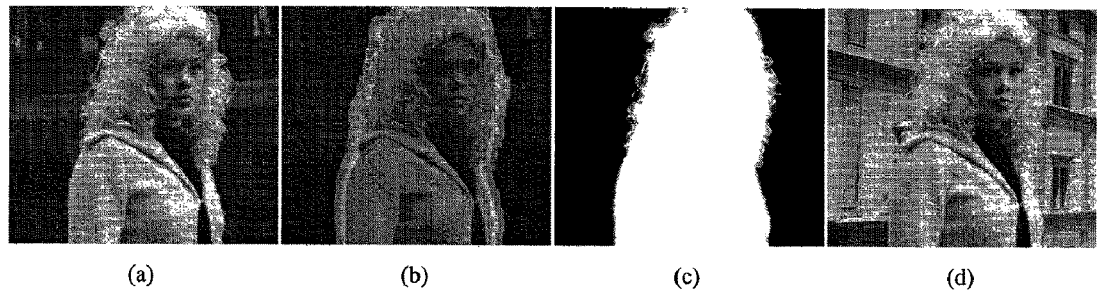
FIG. 1 is a still shot depiction of a series of real-time transformations on the video sequence captured for and used in Chuang et al. 2002, which is used to demonstrate bilayer segmentation in the tri-colour vector space in the manner of the present invention, and more particularly shows: (a) the input frame; (b) the trimap automatic generated from bilayer segmentation; (c) the estimated alpha matte; and (d) the composite result. All images are shown in greyscale for convenience notwithstanding that these datasets are available in color.
Figure 2:
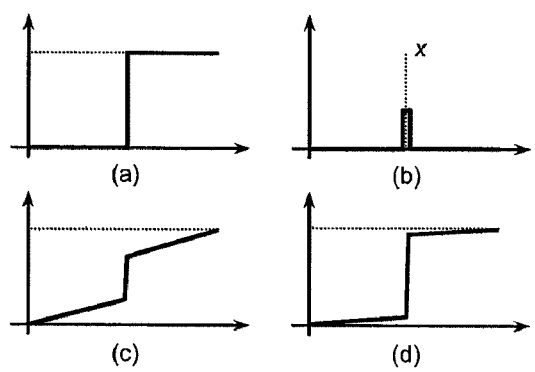
FIG. 2 is a series of graphs demonstrating two competing methods (c) and (d) for reconstructing an unknown function (a) from inaccurate gradient information (b).
Figure 5:
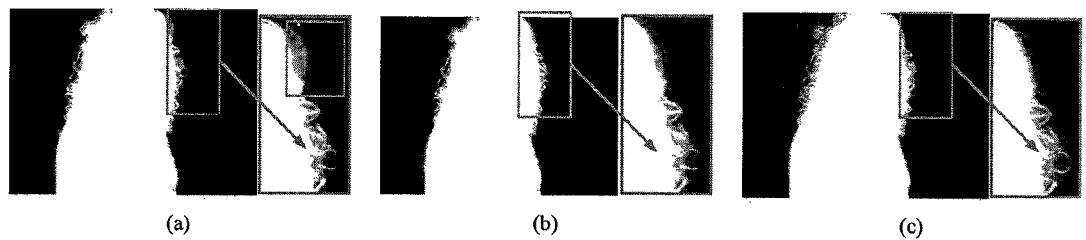
FIG. 5 is a series of images depicting the results for the input frame shown in FIG. 1, for the purposes of comparing the following methods: (a) the results of an implementation of the present invention which does not use background knowledge; (b) the results of an implementation of the present invention which does use background knowledge; and (c) the results using the Bayesian video matting approach, which also uses background. In each case of (a), (b) and (c) the box on the left shows the full image and the box on the right shows a smaller area enlarged.

FIG. 1 and FIG. 5 show the results on a frame of the "walk" sequence, which is originally presented in Chuang et al. 2002. The video is captured by a panning camera that follows a walking actress. Since there is no moving object in the background, once the foreground and background are separated, it is possible to fill in the missing background pixels using nearby frames. Hence, this sequence permits the evaluation of the performance of the preferred implementation of the present invention under both known and unknown background settings.

Image (a) in FIG. 5 shows the result obtained without using the background information and a zoomed in view of hair boundary details of that image. While most of the hair details are extracted, artifacts do exist in the rectangular area of the zoomed in view, where the window's reflection (observable in FIG. 1(*a*)) is not recovered in the background estimated based on the smoothness assumption. This problem becomes more noticeable when the unknown regions get larger, as the foreground/background colors inferred for the unknown regions based the smoothness assumption get more unreliable. Luckily, under controlled environments, this problem can be addressed by pre-capturing an image of the unsmooth background. These artifacts are removed when the known background reconstructed using multiple frames is used for setting up the Poisson equation. The final result is visually comparable to the one generated by the offline Bayesian video matting algorithm, which also uses the background.

Figure 6:
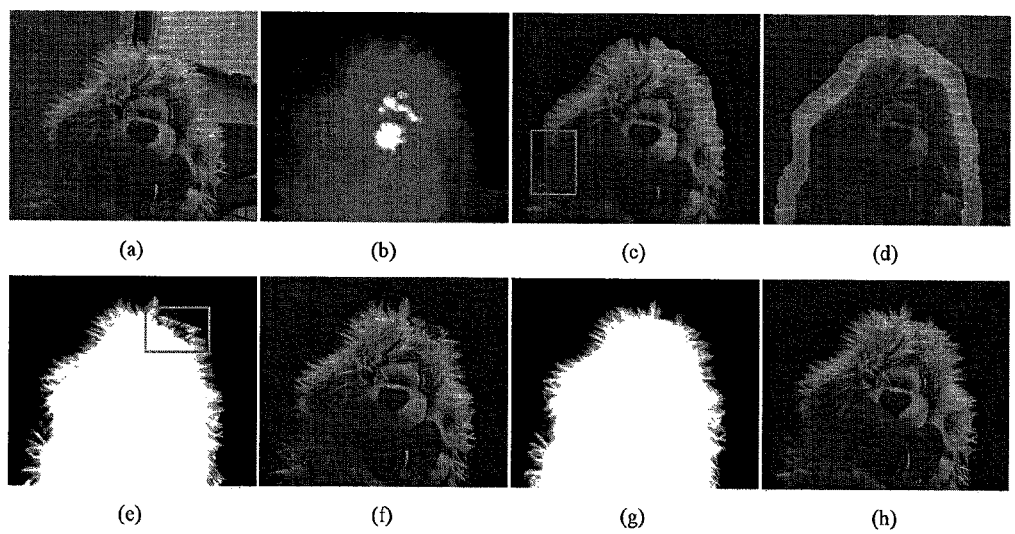
FIG. 6 is a series of images (a) through (h) depicting trimap creation and video matting using the method of the present invention with and without additional depth information, for a frame in the "toy" sequence, as follows: (a) color input frame; (b) depth capture information; (c) bilayer segmentation result; (d) automatically generated trimap; (e-f) results obtained using color information only; and (g-h) results obtained using the additional depth information.

The second test sequence is depicted in FIG. 6, where an indoor scene has been recorded using the 3DV System's Z-Cam. The camera captures both color and depth information, but the color image quality is not ideal. As shown in image (c) of FIG. 6, the poor color contrast and the complex shape of the furry toy cause the bilayer segmentation approach to incorrectly label some background pixels as foreground, especially in the area highlighted by the grey rectangle. The system of the present invention may then address the problem in one of 2 ways. First, most errors are corrected by the proposed matting algorithm by treating a wide band of pixels along the foreground/background boundaries as unknown. Nevertheless, as shown in image (e) of FIG. 6, when the system is implemented using the multichannel Poisson equation set up using color information only, artifacts exist in the area highlighted by the grey rectangle. The artifacts are caused by the background smoothness assumption being violated. Where the strong gradient in the captured color data does not appear in the captured depth data at the same location, by permitting the system of the present invention to use the additional depth information when selecting the Poisson equation, it is able to remove those artifacts.

In terms of processing speed, the method was tested on a Lenovo S10 workstation with Intel 3 GHz Core 2 Duo CPU and NVIDIA Quadro FX 1700 GPU. The presented video matting method runs on the GPU at 40 fps for video sequence of resolution 640×480. The bilayer segmentation in the tests was run on the CPU using a separate procedure. It would be readily apparent to a person of skill in the art that the above procedures may be configured on other computing platforms in known ways, to achieve different results based on the processing power of such computing systems.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

The invention claimed is:

1. A method for extracting an alpha matte from a color input frame using a computer system having a graphics processing unit, comprising the steps of:
   (a) inputting the input frame as a set of frame pixels in a multivariable color space digital format to the computer system;
   (b) applying computer implemented instructions for bilayer segmentation of the input frame to create an initial trimap for the input frame which partitions the frame pixels into initial estimates for a background region, one or more foreground objects and a boundary set;
   (c) the computer system having a selected multichannel Poisson equation;
   (d) the computer system iteratively solving the selected multichannel Poisson equation for the frame pixels within the boundary set, until the earlier of (A) a first decision criteria assigning all such frame pixels to either the foreground objects or the background region if the first decision criteria is met or (B) a second decision criteria to proceed notwithstanding that the first decision criteria has not been met for all pixels; wherein the selected multichannel Poisson equations treat each of a plurality of the dimensions within the multivariable color space as a channel;
   (e) the computer system generating an alpha matte for the input frame in which the frame pixels assigned to the background region set in steps (b) and (d) are assigned a background number, the image pixels assigned to the foreground objects in steps (b) and (d) are assigned a foreground number, and the image pixels not so assigned are each assigned a boundary value representing a percentage by which such frame pixel may be in the foreground or the background.

2. The method of claim 1 in which the selected multichannel Poisson equation is selected from a predetermined set of multichannel Poisson equations consisting of: (A) multichannel Poisson equations for input frames without depth information and without additional background information; (B) multichannel Poisson equations for input frames without depth information and with additional background information; (C) multichannel Poisson equations for input frames with depth information and without additional background information; and (D) multichannel Poisson equations with depth information and with additional background information.

3. The method of claim 2, in which the foreground number is 1 the background number is 0, the first decision criteria is
   (a) to include in the foreground objects each pixel for which the likelihood value is greater than a foreground threshold; and
   (b) to include in the background region each pixel for which the likelihood value is less than a background threshold; and
   the second decision criteria is to stop the iteration of step (d) once a maximum number of iterations has been reached.

4. The method of claim 3 wherein the foreground threshold is greater than 0.75 and less than 1, the background threshold is greater than 0 and less than 0.25, and the maximum number of iterations is no greater than 100.

5. The method of claim 3 wherein the foreground threshold is 0.95, the background threshold is 0.05, and the maximum number of iterations is 64.

6. The method of claim 5 wherein the boundary set from the alpha matte is used as an input to step (d) and steps (d) and (e) are repeated for one or more additional iterations to obtain a revised alpha matte.

7. The method of claim 1 wherein for each frame pixel in the input frame, there is a corresponding depth value, and the availability of the corresponding depth value is used to select the selected multichannel Poisson equation from the predetermined set of multichannel Poisson equations.

8. The method of claim 1 wherein the computer implemented instructions to perform segmentation of the input frame to create the initial trimap compute an initial alpha matte in the multivariable color space prior to solving the selected multivariable Poisson equation in a gradient space.

9. The method of claim 7 wherein and the corresponding depth values form an additional channel in the selected multichannel Poisson equation, and color likelihoods for the foreground objects and the background region are determined using histograms in the multivariable color space, which color likelihoods are updated over successive input frames for use in the selected multichannel Poisson equation.

10. A system for extracting an alpha matte from a color input frame comprising:
    (a) a computer system having a graphics processing unit capable of receiving a digital video signal;
    (b) the color input frame obtained from the digital video signal as a set of frame pixels in a multivariable color space digital format;
    (c) computer implemented instructions on the computer system performing the steps of:
        (i) bilayer segmentation to create an initial trimap for each input frame which partitions the frame pixels into initial estimates for a background region, one or more foreground objects and a boundary set;
        (ii) loading a selected multichannel Poisson equation;
        (iii) iteratively solving the selected multichannel Poisson equation for the frame pixels within the boundary set, until the earlier of (A) a first decision criteria assigning all such frame pixels to either the foreground objects or the background region if the first decision criteria is met or (B) a second decision criteria to proceed notwithstanding that the first decision criteria has not been met for all pixels; where the selected multichannel Poisson equations treat each of a plurality of the dimensions within the multivariable color space as a channel; and
        (iv) generating an alpha matte for the input frame in which the frame pixels assigned to the background region set in steps (i) and (iii) are assigned a background number, the image pixels assigned to the foreground objects in steps (i) and (iii) are assigned a foreground number, and the image pixels not so assigned are each assigned a boundary value representing the percentage by which such frame pixel may be in the foreground or the background and an estimate of the foreground colour of such pixel.

11. The system of claim 10 in which the selected multichannel Poisson equation, prior to loading, is selected from a predetermined set of multichannel Poisson equations consisting of: (A) multichannel Poisson equations for input frames without depth information and without additional background information; (B) multichannel Poisson equations for input frames without depth information and with additional background information; (C) multichannel Poisson equations for input frames with depth information and without additional background information; and (D) multichannel Poisson equations with depth information and with additional background information.

12. The system of claim 11, in which the selected multichannel Poisson equation returns a likelihood value between 0 and 1 for each pixel as to whether or not such pixel is in the foreground region, the foreground number is 1 the background number is 0, the first decision criteria is
 (a) to include in the foreground objects each pixel for which the likelihood value is greater than a foreground threshold; and
 (b) to include in the background region each pixel for which the likelihood value is less than a background threshold; and
the second decision criteria is stop the iteration of step (d) once a maximum number of iterations has been reached.

13. The system of claim 12 wherein the foreground threshold is greater than 0.75 and less than 1, the background threshold is greater than 0 and less than 0.25, and the maximum number of iterations is no greater than 100.

14. The system of claim 12 wherein the foreground threshold is 0.95, the background threshold is 0.05, and the maximum number of iterations is 64.

15. The system of claim 14 wherein the boundary set from the output trimap is used as an input to step (iii) and steps (iii) and (iv) are repeated for one or more additional iterations to obtain a revised output trimap.

16. The system of claim 11 wherein for each frame pixel in the input frame, there is a corresponding depth value, and the availability of the corresponding depth value is used to select the selected multichannel Poisson equation from the predetermined set of multichannel Poisson equations.

17. The system of claim 11 wherein bilayer segmentation computes an initial alpha matte in the multivariable color space prior to solving the selected multivariable Poisson equation in a gradient space.

18. The system of claim 16 wherein and the corresponding depth values form an additional channel in the selected multichannel Poisson equation, and color likelihoods for both the foreground region and the background region are determined using histograms in the multivariable color space, which color likelihoods are updated over successive input frames for use in the selected multichannel Poisson equation.

* * * * *